(12) United States Patent
Zeitlin et al.

(10) Patent No.: US 9,491,190 B2
(45) Date of Patent: Nov. 8, 2016

(54) DYNAMIC SELECTION OF NETWORK TRAFFIC FOR FILE EXTRACTION SHELLCODE DETECTION

(71) Applicant: Guardicore Ltd., Tel Aviv (IL)

(72) Inventors: Ariel Zeitlin, Kfar Saba (IL); Pavel Gurvich, Tel Aviv (IL); Ofri Ziv, Tel Aviv (IL); Tal Zarfati, Tel Aviv (IL)

(73) Assignee: GUARDICORE LTD., Tel Aviv (IL)

( * ) Notice: Subject to any disclaimer, the term of this patent is extended or adjusted under 35 U.S.C. 154(b) by 61 days.

(21) Appl. No.: 14/562,716

(22) Filed: Dec. 7, 2014

(65) Prior Publication Data

US 2015/0188933 A1    Jul. 2, 2015

Related U.S. Application Data

(60) Provisional application No. 61/920,823, filed on Dec. 26, 2013, provisional application No. 61/922,910, filed on Jan. 2, 2014.

(51) Int. Cl.
*G06F 11/00* (2006.01)
*H04L 29/06* (2006.01)
*G06F 21/53* (2013.01)
*G06F 21/56* (2013.01)

(52) U.S. Cl.
CPC .......... *H04L 63/1408* (2013.01); *G06F 21/53* (2013.01); *G06F 21/56* (2013.01)

(58) Field of Classification Search
CPC .......... H04L 63/1416; H04L 63/1425; H04L 63/1441; H04L 63/145; H04L 63/1466; H04L 63/1475; H04L 63/20; H04L 63/0272
USPC .................. 726/13–15, 22–24; 713/187, 188
See application file for complete search history.

(56) References Cited

U.S. PATENT DOCUMENTS

| | | | |
|---|---|---|---|
| 7,159,149 B2 | 1/2007 | Spiegel et al. | |
| 7,251,215 B1 | 7/2007 | Turner et al. | |
| 7,363,656 B2 | 4/2008 | Weber et al. | |
| 7,383,578 B2 | 6/2008 | Blake et al. | |
| 8,006,305 B2 * | 8/2011 | Aziz | G06F 21/552 726/22 |
| 8,051,480 B2 * | 11/2011 | Mahaffey | H04W 12/10 713/340 |
| 8,181,250 B2 | 5/2012 | Rafalovich et al. | |
| 8,185,953 B2 * | 5/2012 | Rothstein | H04L 63/1416 726/22 |

(Continued)

OTHER PUBLICATIONS

Prevelakis et al., "Sandboxing Applications", Proceedings of the FREENIX Track, USENIX Annual Technical Conference, 8 pages, year 2001.

Goldberg et al., "A Secure Environment for Untrusted Helper Applications: Confining the Wily Hacker", Proceedings of the Sixth USENIX UNIX Security Symposium, 14 pages, Jul. 1996.

(Continued)

*Primary Examiner* — Hosuk Song
(74) *Attorney, Agent, or Firm* — D. Kligler IP Services Ltd.

(57) ABSTRACT

A method for network security includes, in a computer network that exchanges traffic among multiple network endpoints using one or more network switches, configuring at least one network switch to transfer at least some of the traffic for inspection. Only a portion of the traffic, which is suspected of carrying executable software code, is selected from the transferred traffic. The selected portion of the traffic is inspected, so as to verify whether any of the executable software code is malicious.

28 Claims, 2 Drawing Sheets

(56) References Cited

U.S. PATENT DOCUMENTS

| | | | |
|---|---|---|---|
| 8,413,216 | B2 | 4/2013 | Hughes et al. |
| 8,526,433 | B2 | 9/2013 | Kini et al. |
| 8,726,379 | B1* | 5/2014 | Stiansen ............ H04L 63/1491 726/22 |
| 8,990,938 | B2 | 3/2015 | Huston et al. |
| 2003/0137930 | A1 | 7/2003 | Futernik |
| 2008/0289028 | A1 | 11/2008 | Jansen et al. |
| 2009/0073895 | A1 | 3/2009 | Morgan et al. |
| 2010/0333177 | A1* | 12/2010 | Donley ................ G06F 21/566 726/4 |
| 2012/0254951 | A1 | 10/2012 | Munetoh et al. |
| 2013/0269033 | A1 | 10/2013 | Amaya Calvo et al. |
| 2014/0115706 | A1 | 4/2014 | Silva et al. |
| 2014/0181968 | A1 | 6/2014 | Ge et al. |
| 2014/0181972 | A1 | 6/2014 | Karta et al. |
| 2015/0058983 | A1 | 2/2015 | Zeitlin et al. |

OTHER PUBLICATIONS

Polychronakis et al., "Comprehensive Shellcode Detection using Runtime Heuristics", Proceedings of the 26th Annual Computer Security Applications Conference, 10 pages, Dec. 2010.

Wicherski et al., "Efficient Bytecode Analysis: Linespeed Shellcode Detection", 11 pages, Mar. 2011.

OpenFlow Switch Specification, Version 1.1.0 Implemented (Wire Protocol 0x02), 56 pages, Feb. 28, 2011.

Cisco, "One Platform Kit (onePK) for Developers", Data sheet, 1 page, Mar. 2014.

InfiniBand Architecture Specification, vol. 1, Release 1.2.1, 1727 pages, Nov. 2007.

Tal et al., U.S. Appl. No. 14/596,240, filed Jan. 14, 2015.

U.S. Appl. No. 14/262,750 Office Action dated Jul. 9, 2015.

* cited by examiner

DYNAMIC SELECTION OF NETWORK TRAFFIC FOR FILE EXTRACTION SHELLCODE DETECTION

CROSS-REFERENCE TO RELATED APPLICATIONS

This application claims the benefit of U.S. Provisional Patent Application 61/920,823, filed Dec. 26, 2013, and U.S. Provisional Patent Application 61/922,910, filed Jan. 2, 2014, whose disclosures are incorporated herein by reference.

FIELD OF THE INVENTION

The present invention relates generally to network security, and particularly to methods and systems for protection against malicious executable files.

SUMMARY OF THE INVENTION

An embodiment of the present invention that is described herein provides a method for network security in a computer network that exchanges traffic among multiple network endpoints using one or more network switches. The method includes configuring at least one network switch to transfer at least some of the traffic for inspection. Only a portion of the traffic, which is suspected of carrying executable software code, is selected from the transferred traffic. The selected portion of the traffic is inspected, so as to verify whether any of the executable software code is malicious.

In some embodiments, the network endpoints include Virtual Machines (VMs), the network switch includes a virtual switch that serves the VMs, and selection of the portion of the traffic is performed by a selection software module coupled to the virtual switch. In other embodiments, the computer network includes a Software-Defined Network (SDN) whose network switches are controlled by an SDN controller, and selection of the portion of the traffic is performed by a selection application connected to the SDN controller.

In an embodiment, selecting the portion of the traffic includes detecting in the traffic one or more executable files suspected of malicious code. Additionally or alternatively, selecting the portion of the traffic includes detecting a suspected shellcode in the traffic. In another embodiment, selecting the portion includes choosing the portion from traffic that is exchanged between Virtual Machines (VMs) within a single physical node of the computer network.

In an example embodiment, inspecting the selected portion includes inspecting only a predefined data size in a beginning of each selected traffic session. In another embodiment, selecting the portion includes defining a prioritization among suspected traffic sessions in accordance with deviation of the suspected traffic sessions from a predefined baseline behavior, and selecting one or more of the suspected traffic sessions for inspection based on the prioritization.

In a disclosed embodiment, selecting the portion includes prioritizing selection of the portion based on an a-priori characteristic of the traffic. In another embodiment, selecting the portion includes receiving indications external to the traffic, and prioritizing selection of the portion based on the indications. In yet another embodiment, selecting the portion includes identifying a file that is transferred in the traffic, examining a header of the file, and selecting the file for inspection upon identifying, based on the header, that the file is executable.

In some embodiments, at least one of the network endpoints includes a Virtual Machine (VM), and selecting the portion includes examining an internal process in the VM, which initiates the selected portion of the traffic, using memory introspection. In an embodiment, selecting the portion includes running multiple traffic selection modules in the computer network, and coordinating selection of the portion by communication among the multiple traffic selection modules.

In some embodiments, upon detecting malicious executable software code in given traffic, the method includes selecting for inspection subsequent traffic having characteristics that match the given traffic. In an embodiment, selection of the portion of the traffic or inspection of the selected portion are performed at least partially in the network switches.

There is additionally provided, in accordance with an embodiment of the present invention, a system for security in a computer network that exchanges traffic among multiple network endpoints using one or more network switches. The system includes a traffic selection module and an inspection module. The traffic selection module is configured to receive from at least one of the network switches at least some of the traffic for inspection, and to select from the received traffic only a portion of the traffic that is suspected of carrying executable software code. The inspection module is configured to inspect the selected portion of the traffic, so as to verify whether any of the executable software code is malicious.

There is further provided, in accordance with an embodiment of the present invention, a computer software product, the product including a tangible non-transitory computer-readable medium in which program instructions are stored, which instructions, when read by a processor of a compute node in a computer network that exchanges traffic among multiple network endpoints using one or more network switches, cause the processor to receive from at least one of the network switches at least some of the traffic for inspection, to select from the received traffic only a portion of the traffic that is suspected of carrying executable software code, and to send the selected portion of the traffic for inspection so as to verify whether any of the executable software code is malicious.

The present invention will be more fully understood from the following detailed description of the embodiments thereof, taken together with the drawings in which:

DETAILED DESCRIPTION OF EMBODIMENTS

Overview

Many types of malicious attacks on computer networks involve transfer of executable software code from one network endpoint to another. Such executable code may be malicious by itself, e.g., a virus or a Trojan horse. In other cases the executable code comprises a shellcode, i.e., a small piece of code that gives the attacker some control over the endpoint and allows subsequent delivery of malicious code.

In modern computer networks, such as virtualized data centers and Software-Defined Networks (SDNs), the volume of traffic exchanged over the network is huge. The large traffic volume, and the computational complexity of detecting and inspecting executable code, make it unfeasible to inspect all or even most of the traffic.

Embodiments of the present invention that are described herein provide improved methods and systems for protecting a computer network from attacks. The disclosed techniques efficiently identify and select only small portions of the network traffic that contain executable code. The selected portion is then sent for inspection. In some embodiments, selection of traffic for inspection is performed by a traffic selection module that is coupled to one of the network switches. Depending on the network architecture, the switches, as well as the endpoints, may be physical or virtual.

Various traffic selection techniques and example system configurations are described herein. In some embodiments, the endpoints comprise Virtual Machines (VMs), and the traffic selection module runs on the same compute node as the VMs it protects. In some of these techniques, the traffic selection module exploits the access it has to internal VM memory, and thus to processes, files and data structures of the VM, to obtain information that assists in identifying traffic carrying potentially-hostile executable code. In other embodiments, multiple traffic selection modules running in multiple compute nodes cooperate with one another in identification and selection of traffic for inspection.

The methods and systems described herein are highly effective in identifying and selecting traffic that is suspected of conveying executable software code. By using the disclosed techniques, it is possible to reduce the volume of inspected traffic to a fraction of the total traffic volume. As such, available inspection resources can be utilized efficiently, and attacks can be detected with high detection rate and low false detection rate.

EXAMPLE CONFIGURATION

Virtualized Data Center

Figure 1:
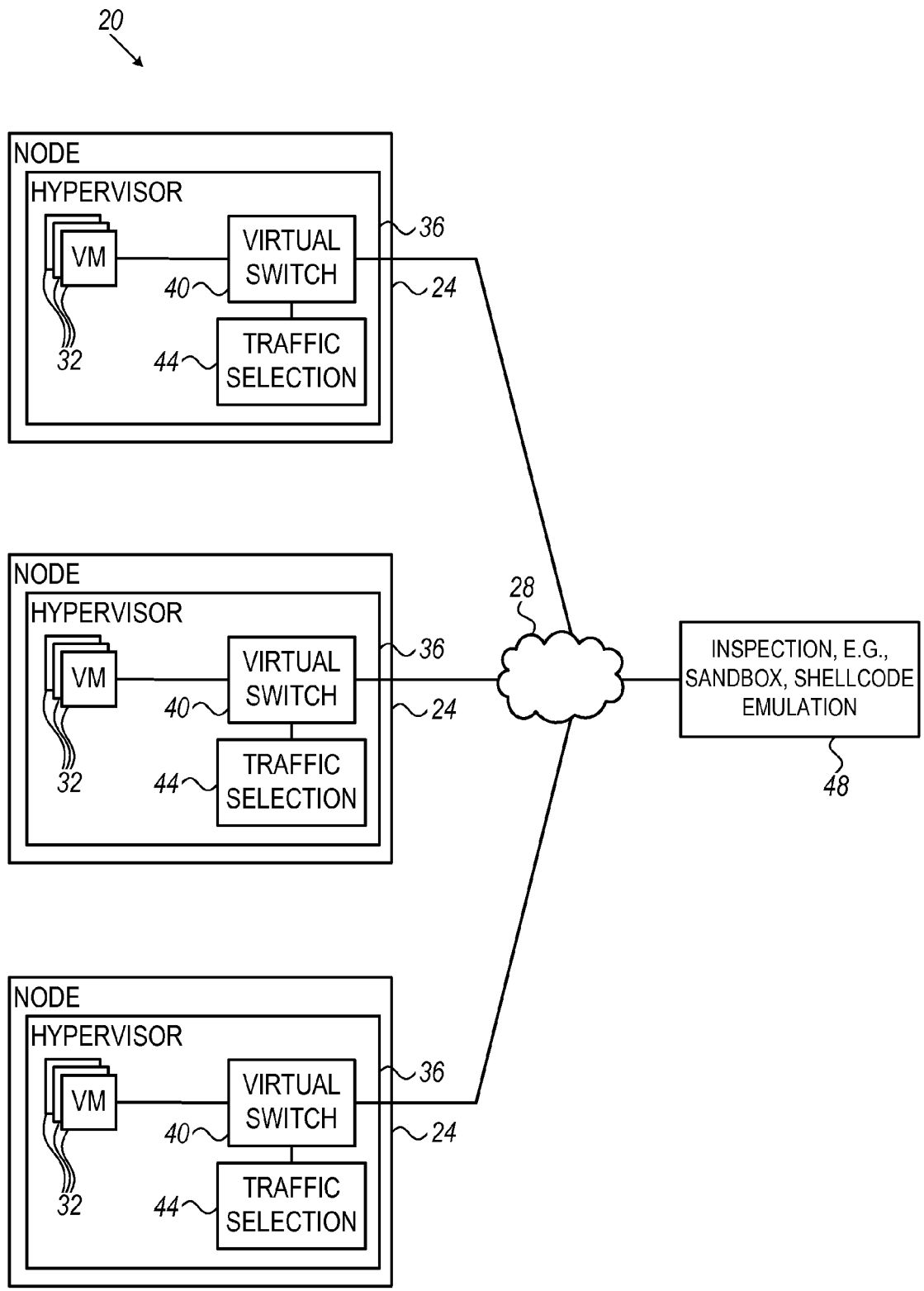
FIG. 1 is a block diagram that schematically illustrates a protected virtualized computing system, in accordance with an embodiment of the present invention.

FIG. 1 is a block diagram that schematically illustrates a protected virtualized computing system 20, in accordance with an embodiment of the present invention. System 20 may comprise, for example, a virtualized data center or a system that performs any other suitable computing function.

System 20 comprises multiple compute nodes 24 that communicate with one another over a computer network 28. Nodes 24 may comprise, for example, servers, workstations or any other suitable computing platform. Network 28 may operate in accordance with any suitable protocol, such as Ethernet or Infiniband.

At least some of nodes 24 run Virtual Machines (VMs) 32, which in turn run various client applications. In each node, a hypervisor 36 implements a virtualization layer that assigns physical resources (e.g., CPU, memory, storage and networking resources) to the VMs. In the present context, both VMs 32 and nodes 24, i.e., both virtual and physical machines, are referred to as network endpoints.

In the present example, hypervisor 36 of each node 24 runs a respective virtual network switch 40 (also referred to as soft switch) that forwards traffic for the VMs running on the node. Typically, the virtual switch forwards both the traffic between VMs on the same node, and traffic exchanged between VMs on different nodes. (In many real-life implementations, hypervisor 36 runs multiple interconnected virtual switches that jointly form a complex switching fabric. In the context of the present patent application and in the claims, the terms "switch" and "network switch" refer both to a single switch and to multiple interconnected switches, whether physical or virtual.)

In the embodiment of FIG. 1, hypervisor 36 of each node 24 runs a respective traffic selection module 44 that is connected to the respective virtual switch 40 of the node. Module 44 monitors the traffic traversing the virtual switch, and identifies and selects a portion of the traffic that is suspected of containing executable code. Such traffic may comprise, for example, executable files such as viruses, or small pieces of code such as shellcode.

Since traffic selection module 44 is coupled to switch 40, it is able to select and send for inspection traffic that is exchanged between VMs that run in the same hypervisor, all within a single node 24. The capability of inspecting internal traffic, which is not present on network 28 at all, increases the detection performance considerably. Generally, however, modules 44 examine both internal traffic (internal to the node) and external traffic (traffic exchanged with other nodes).

In an embodiment, traffic selection module 44 configures switch 40 to transfer (e.g., forward or mirror) the traffic to the traffic selection module. Alternatively, switch configuration can be performed by some management function.

Upon identifying a traffic session (e.g., packet flow) that is suspected of carrying executable code, module 44 transfers some or all of the suspected session to an inspection module 48. The inspection module may be implemented on a standalone node, or on one of the nodes that also run VMs, for example. In an example embodiment, some or all of the inspection functions may be implemented on the node from which the traffic originates, or on the node to which the traffic is destined, often close to the traffic selection module.

Inspection module 48 may carry out any suitable technique for verifying whether the inspected traffic indeed carries executable code, and/or whether this code is malicious or innocent. For example, module 48 may employ known sandbox techniques that test suspicious executable files in an isolated environment. Sandbox techniques that can be used by module 48 are described, for example, by Prevelakis and Spinellis, in "Sandboxing Applications," Proceedings of the FREENIX Track: 2001 USENIX Annual Technical Conference, 2001; and by Goldberg et al., in "A Secure Environment for Untrusted Helper Applications (Confining the Wily Hacker)," Proceedings of the Sixth USENIX UNIX Security Symposium, July, 1996, which are incorporated herein by reference.

Additionally or alternatively, module 48 may employ known shellcode emulation techniques that attempt to execute binary code suspected of comprising shellcode. Shellcode emulation techniques that can be used by module 48 are described, for example, by Polychronakis et al., in "Comprehensive Shellcode Detection using Runtime Heuristics," Proceedings of the 26th Annual Computer Security Applications Conference, December, 2010; and by Wicherski, in "Efficient Bytecode Analysis: Linespeed Shellcode Detection," March, 2011, which is incorporated herein by reference.

In some embodiments, selection modules 44 receive indications from external sources (not shown in the figure)

that assist in the traffic selection process. External sources may comprise, for example, behavioral analysis tools. Several examples of such indications and their use in traffic selection are given further below. In some embodiments, system 20 comprises a management module (not shown in the figure) that connects to the external sources. The management module typically also collects, analyzes and presents the inspection results (e.g., detected malicious code or shellcode).

Alternative Configuration for SDN

Figure 2:
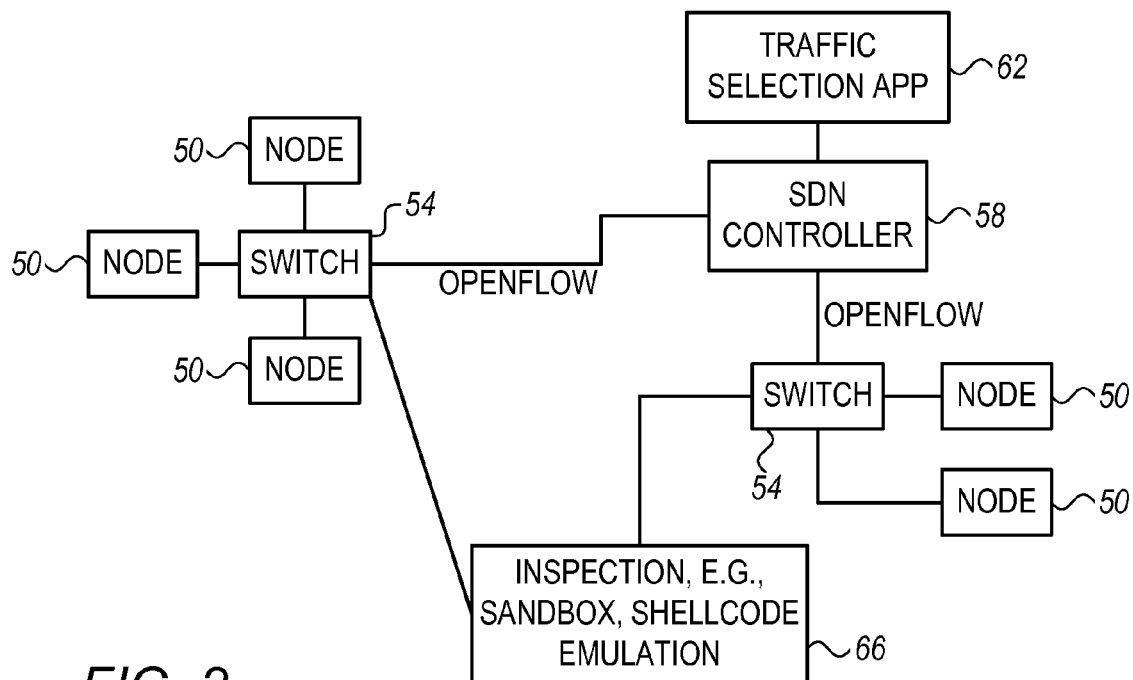
FIG. 2 is a block diagram that schematically illustrates a protected Software-Defined Network (SDN), in accordance with an alternative embodiment of the present invention.

FIG. 2 is a block diagram that schematically illustrates a protected Software-Defined Network (SDN), in accordance with an alternative embodiment of the present invention. In this embodiment, the SDN comprises multiple compute nodes 50 that serve as endpoints. Switches 54, typically physical network edge switches, are used for forwarding traffic among nodes 50. (Alternatively, nodes 50 may comprise VMs, and switches 54 may comprise virtual switches.)

The SDN further comprises an SDN controller 58 that configures and controls switches 54. The SDN controller may configure and control switches 54 using any suitable protocol, such as OpenFlow or OnePK. OpenFlow is specified, for example, in "OpenFlow Switch Specification, Version 1.1.0 Implemented (Wire Protocol 0x02)", Feb. 28, 2011, which is incorporated herein by reference. OnePK is described, for example, in "One Platform Kit (onePK) for Developers," March, 2014, which is incorporated herein by reference.

In the SDN example of FIG. 2, the traffic selection functionality is carried out by a traffic selection application 62 that runs on top of SDN controller 58. Application 62 may run in the SDN controller, or it may communicate with the SDN controller using a suitable Application Programming Interface (API), for example. The SDN further comprises an inspection module 66, which is similar in functionality to module 48 of FIG. 1 above.

Typically, SDN controller 58 configures switches 54 to transfer (e.g., forward or mirror) some or all of the traffic traversing the switches for inspection. Selection of traffic for inspection may be performed by traffic selection application 62 and/or locally at switches 54. In an embodiment, application 62 inspects the transferred traffic, selects a portion of the traffic that is suspected of containing executable code, and sends the selected portion of the traffic for inspection by inspection module 66. In another embodiment, application instructs that the traffic is sent to switches 54, which perform local traffic inspection. When a switch 54 completes inspecting a given flow, it may request application 62 to stop forwarding traffic of this flow. In an example embodiment, a given switch 54 may be configured with "static" redirection rules and a local traffic selection module that offloads specific sessions after inspection "dynamic" rules.

In some embodiments, the SDN comprises an extraction module (not shown in the figure) that extracts files from the selected portion of the traffic and transfers the extracted files to inspection module 66. In other embodiments, extraction of the files may be performed by application 62 or by inspection module 66.

In some embodiments, selection application 62 receives indications from external sources (not shown in the figure) that assist in the selection process. External sources may comprise, for example, behavioral analysis tools or cloud management services. Several examples of such indications and their use in traffic selection are given further below. In some embodiments, the system of FIG. 2 comprises a management module that connects to external sources. The management module typically also collects, analyzes and presents the inspection results (e.g., detected malicious code or shellcode).

When detecting a malicious executable code (e.g., malicious file or shellcode), inspection module 66 may communicate with selection application 62 (either directly or via the extraction module) and request application 62 to take appropriate countermeasures. Application 62 may, for example, block the node in question from accessing the network, e.g., by configuring appropriate rules in the switch that is connected to that node.

The system configurations shown in FIGS. 1 and 2 are example configurations, which are chosen purely for the sake of conceptual clarity. In alternative embodiments, any other suitable configurations can be used. For example, in FIG. 1, not all nodes necessarily run traffic selection modules, and/or a given traffic selection module may serve VMs on a different node. As another example, in both FIG. 1 and FIG. 2, the system may comprise more than a single inspection module.

As yet another example, some of the functionality of selecting traffic for inspection and/or inspecting selected traffic may be performed in the network switches. Such solutions are feasible for both physical switches (e.g., switches 54 in FIG. 2) and virtual switches (e.g., switches 40 in FIG. 1). For example, a switch may perform some or all shellcode inspection functions.

The different system elements shown in FIGS. 1 and 2, such as switches 40 and 54, traffic selection modules 44 and application 62, and inspection modules 48 and 66, may be implemented using any suitable hardware, such as in an Application-Specific Integrated Circuit (ASIC) or Field-Programmable Gate Array (FPGA). Alternatively, the various system elements can be implemented using software, or using a combination of hardware and software elements.

In some embodiments, nodes 24, nodes 50, inspection module 48, inspection module 66 and/or SDN controller 58 may comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 3:
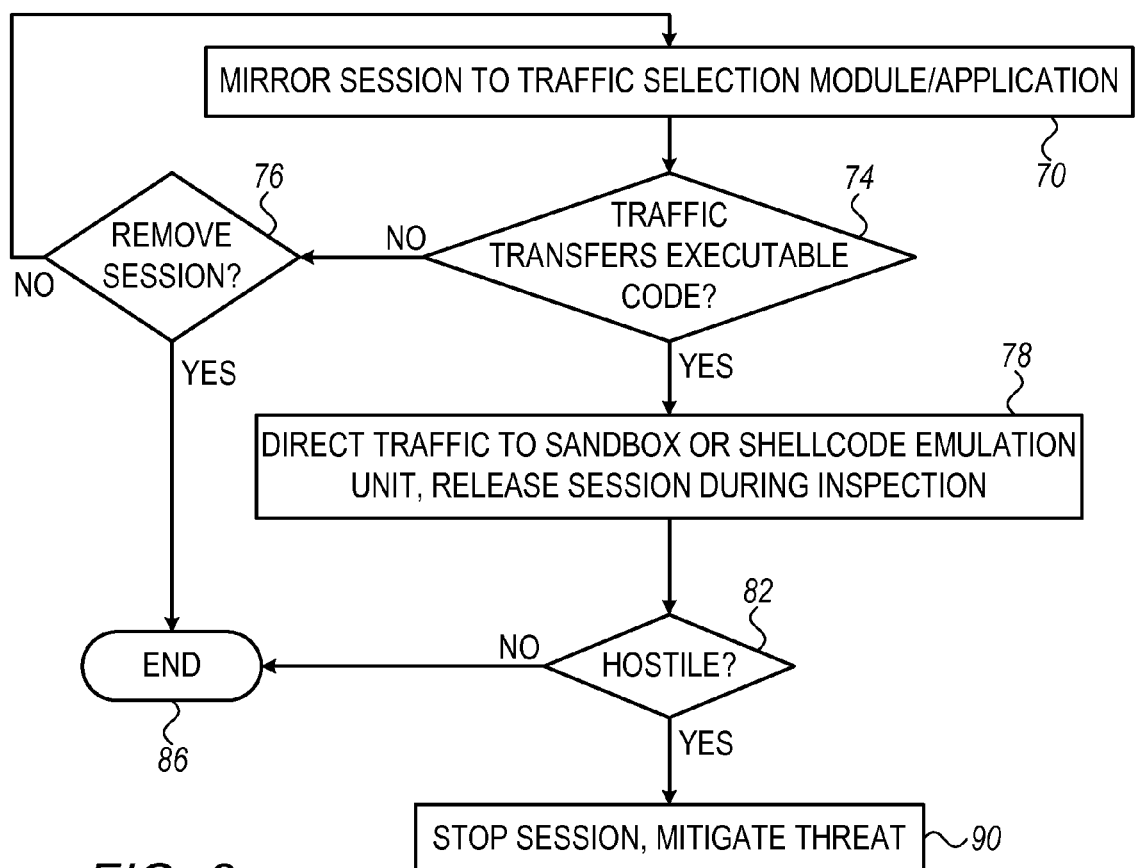
FIG. 3 is a flow chart that schematically illustrates a method for protection against malicious executable files, in accordance with an embodiment of the present invention.

FIG. 3 is a flow chart that schematically illustrates a method for protection against malicious executable code, in accordance with an embodiment of the present invention. The method begins with a switch (40 or 54) mirroring a traffic session to traffic selection module/application (44 or 62), at a mirroring step 70.

At a checking step 74, the traffic selection module/application checks whether the session traffic is suspected of containing executable code. Note that in some cases, e.g., in the case of shellcode, checking step 74 does not conclude that the session traffic contains executable code, only that it is suspected of containing code. The conclusion that the traffic indeed contains executable code may be established later, at the inspection stage.

If the traffic is not suspected of containing executable code, the traffic selection module/application checks whether the session is to be removed from mirroring, at a removal checking step 76. If the session is to be removed, e.g., because no suspected executable code was found in the beginning (e.g., first 1K bytes) of the session, the method ends at an innocent termination step 86. Otherwise the method loops back to step 70 above.

If the checking result at step 74 is positive, the traffic selection module/application sends some or all of the session traffic to inspection module (48 or 66), at an inspection delivery step 78. The session is typically allowed to proceed during inspection.

At a testing step 82, the inspection module (48 or 66) checks whether the executable code in question is hostile or innocent. (In the case of shellcode, module 66 first verifies, using CPU emulation, whether the suspected traffic indeed contains executable code.)

If the code is innocent, the inspection module allows the session to proceed, e.g., allows the file transfer to proceed, at innocent termination step 86. If the code is declared hostile, the inspection module terminates the session, and initiates mitigation of the detected threat, at a hostile termination step 90.

The process of FIG. 3 is an example process, which is depicted purely for the sake of conceptual clarity. In alternative embodiments, any other suitable method flow can be used.

Example Traffic Selection Schemes

As noted above, an attack on a computer network often involves transfer of executable software code from one network endpoint to another. Such code may comprise, for example, malicious executable files such as viruses or Trojan horses, tools used by the attacker, shellcode, or other types of executable code. The disclosed techniques detect attacks by detecting and inspecting traffic carrying executable software code.

The techniques described below are applicable, mutatis mutandis, to the virtualized data center configuration of FIG. 1, to the SDN configuration of FIG. 2, as well as to any other suitable network configuration. Some of the examples below refer to selection module 44 or to selection application 62, for the sake of clarity. Generally, each of the examples is applicable to either module 44 or application 62.

An attacker may transfer files using any suitable protocol, e.g., Hyper-Text Transfer Protocol (HTTP), Trivial File Transfer Protocol (TFTP) or Server Message Block (SMB). Alternatively, the attacker may transfer code using some proprietary protocol and using various Transmission Control Protocol (TCP) ports in order to evade detection.

In some embodiments, inspection module 48 inspects only a predefined data size at the beginning of each suspected session. The data size may specified in terms of a given number of bytes, e.g., the first 10 KB of each session. Alternatively, the data size may specified in terms of time, e.g., the first N seconds of the session. The rest of the session is excluded from inspection. Since the majority of data-center sessions are long, this technique reduces the volume of inspected traffic significantly.

The rationale behind the above technique is that executable code, if present, will typically be small and will typically be located at the beginning of the session. These assumptions hold in practice with high probability. In a variant of this embodiment, if executable code is detected during inspection, inspection will proceed until the end of the code, even if exceeding the predefined data size.

In the configuration of FIG. 2, the above technique can be implemented by application 62 configuring switches (e.g., using OpenFlow commands) with mirroring rules that cause the switches to mirror new sessions to inspection module 66 (or to the extraction module that extracts files for module 66). In an embodiment, the rules have a short expiration time, e.g., two seconds, and therefore only the beginning of each new session will be mirrored. In an embodiment, if module 66 (or the extraction module) detects a beginning of a file during this period, it may communicate with application 62 or with switch 54 directly, in order to extend the expiration period and enable mirroring and extraction of the entire file.

In some embodiments, selection module 44 prioritizes suspected sessions in accordance with their deviation from some predefined statistical behavior pattern. The sessions that deviate the most will be selected and sent for inspection for presence of executable code. The baseline behavior may consider any suitable factor. For example, the baseline behavior may define how common the two endpoints of the sessions communicate over the given ports. In this example, a session between endpoints that do not communicate regularly, or a session over uncommon ports, will be considered suspicious. As another non-limiting example, the baseline behavior may consider how common it is for the two endpoints of the session to communicate at the given time (e.g., time of day or day of week). A deviation from this pattern will typically be considered suspicious.

In the configuration of FIG. 2, the above technique can be implemented by application 62 collecting traffic statistics over time. Application 62 also configures switches 54 (e.g., using OpenFlow commands) to report beginning of sessions. For each session reported by a switch, application 62 may decide whether that session deviates from the baseline behavior pattern. If so, the application may instruct the switch to mirror the session to module 66 (or to the preceding extraction module) for inspection.

In some embodiments, selection module 44 uses some a-priori characteristic of the traffic, which increases or decreases the likelihood that certain sessions carries malicious files. The selection module may use this characteristic to prioritize the selection and inspection of sessions. At the extreme, certain sessions may be excluded from inspection altogether, whereas other sessions may be selected and inspected immediately.

For example, sessions originating from user-facing endpoints (as opposed to back-end processing endpoints) may be regarded as more likely to carry malicious executable code. As another example, traffic that is known to comprise database replication sessions may be regarded safe and excluded from inspection. The latter criterion is highly effective since it often excludes from inspection very large traffic volumes.

In the configuration of FIG. 2, the above technique can be implemented by pre-configuring application 62 with session attributes (e.g., session types, endpoints, nodes and/or protocols) that can be safely excluded from inspection. Upon detecting a session that matches these attributes, the selection application may command the relevant switch to exclude the session from inspection by module 66.

In some embodiments, selection module 44 receives indications from some source that is external to the traffic, and uses these indications to prioritize the selection and inspection of sessions. For example, module 44 may receive an indication from a behavioral analysis tool that identifies a certain endpoint as suspicious. Based on this indication, module 44 may increase the priority of selecting and inspecting sessions involving the suspicious endpoint. As another example, module 44 may receive an indication from a cloud management service, which reports that a VM is migrating from one endpoint to another. Based on this indication, module 44 may exclude from inspection traffic that is known to be associated with the migration process.

In the configuration of FIG. 2, the above technique can be implemented by application 62 communicating with the external sources of the indications. Based on the indications, application 62 instructs the relevant switches (e.g., using OpenFlow commands) to mirror or refrain from mirroring specific sessions to inspection module 66.

In some embodiments, module 44 first detects that a file is being transferred in a certain session. Upon detecting a file transfer, selection module 44 may examine the header of the file. If the header indicates a file type that is not executable, the session may be excluded from inspection (at least for the duration in bytes of the transferred file, which may also be specified in the header).

In some embodiments, which are particularly relevant to VMs and virtual switches as in FIG. 1, selection module 44 may select sessions for inspection using memory introspection in VMs 32. In an embodiment, module 44 extracts the process in a given VM 32 that is responsible for a given session. If the process is a known process (e.g., a signed or otherwise authorized process), module 44 may exclude the session from inspection. This sort of technique takes advantage of the close coupling between module 44 and VMs 32, which run in the same hypervisor of the same node.

In one possible implementation of the above technique, module 44 is aware of the type and version of the operating system of the VM that initiates the session. This knowledge may be obtained, for example, from an administrator, from a cloud management service such as vSphere or OpenStack, or by pattern matching the memory of the VM. Module 44 may examine the appropriate location in the kernel memory (using memory introspection), detect the socket that is responsible for the session, and then detect the process that holds the socket. Module 44 is then able to access the image of the process—the image name is typically given in the process structure in the operating system.

The opposite logic can also be used: If the process is not known (e.g., not signed or otherwise authorized), module 44 may prioritize the session higher for inspection, and/or hold it for a longer time period.

In some embodiments, after a shellcode or malicious file has been detected, module 44 may detect the initiating process using the above technique, and instruct other elements of hypervisor 36 to prioritize this sort of process for inspection.

In some embodiments, after a shellcode has been detected, module 44 selects or at least prioritizes for inspection all sessions having similar characteristics (e.g., protocol, destination port). In an embodiment, module 44 looks for the specific signature of the shellcode in the traffic (which is faster than emulation for detecting shellcodes).

For example, for each destination port, module 44 may examine the beginning of the session and verify whether the protocol of the session is the expected protocol. If so, the session can be excluded from inspection. For example, if a given port is known to be used for database replication, module 44 may examine the beginning of a session and determine whether the session is indeed a database replication session and not an attack that abuses a permitted port in the firewall.

In some embodiments, modules 44 in the various nodes of system 20 communicate and cooperate with one another in selecting sessions for inspection. Consider, for example, a scenario in which a malicious file has been detected in traffic that was selected by a given module 44. That module 44 may signal its peer modules 44 on other nodes 24 to examine the various VMs 32 and search for such file in the file-systems of these machines using memory introspection.

The selection methods and criteria described above are examples, which are chosen purely for the sake of conceptual clarity. In alternative embodiments, any other suitable selection methods and criteria can be used.

Although the embodiments described herein mainly address security applications that detect malicious code, the methods and systems described herein can also be used in other applications, such as for tracking file transfers in network management or visualization tools.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for network security, comprising:
in a computer network that exchanges traffic among multiple network endpoints, selecting, from the traffic generated in a Virtual Machine (VM) running on a network endpoint, only a portion of the traffic that is suspected of carrying executable software code, by examining using memory introspection an internal process in the VM that initiates the portion of the traffic; and
inspecting the selected portion of the traffic, so as to verify whether any of the executable software code is malicious.

2. The method according to claim 1, wherein the network endpoint comprises a virtual switch that serves the VM, and wherein selection of the portion of the traffic is performed by a selection software module coupled to the virtual switch.

3. The method according to claim 1, wherein inspecting the selected portion of the traffic comprises detecting in the traffic one or more executable files suspected of being malicious code.

4. The method according to claim 1, wherein inspecting the selected portion of the traffic comprises detecting a suspected shellcode in the traffic.

5. The method according to claim 1, wherein selecting the portion comprises choosing the portion from traffic that is exchanged between Virtual Machines (VMs) within a single physical node of the computer network.

6. The method according to claim 1, wherein inspecting the selected portion comprises inspecting only a predefined data size in a beginning of each selected traffic session.

7. The method according to claim 1, wherein selecting the portion comprises prioritizing selection of the portion based on an a-priori characteristic of the traffic.

8. The method according to claim 1, wherein selecting the portion comprises receiving indications external to the traffic, and prioritizing selection of the portion based on the indications.

9. The method according to claim 1, wherein selecting the portion comprises identifying a file that is transferred in the traffic, examining a header of the file, and selecting the file for inspection upon identifying, based on the header, that the file is executable.

10. The method according to claim 1, wherein selecting the portion comprises running multiple traffic selection modules in the computer network, and coordinating selection of the portion by communication among the multiple traffic selection modules.

11. The method according to claim 1, and comprising, upon detecting malicious executable software code in given traffic, selecting for inspection subsequent traffic having characteristics that match the given traffic.

12. The method according to claim 1, wherein selection of the portion of the traffic or inspection of the selected portion are performed at least partially in network switches of the communication network.

13. The method according to claim 1, wherein selecting the portion of the traffic comprises detecting that the internal process is not previously known and authorized.

14. The method according to claim 1, wherein selecting the portion of the traffic comprises examining the internal process using a hypervisor that serves the VM on the network endpoint.

15. A method for network security, comprising:
in a computer network that exchanges traffic among multiple network endpoints, selecting from the traffic only a portion of the traffic that is suspected of carrying executable software code, by defining a prioritization among suspected traffic sessions in accordance with deviation of the suspected traffic sessions from a predefined baseline behavior, and selecting one or more of the suspected traffic sessions for inspection based on the prioritization; and
inspecting the selected portion of the traffic, so as to verify whether any of the executable software code is malicious.

16. A system for security in a computer network that exchanges traffic among multiple network endpoints, the system comprising:
a traffic selection module, which is configured to select, from the traffic generated in a Virtual Machine (VM) running on a network endpoint, only a portion of the traffic that is suspected of carrying executable software code, by examining using memory introspection an internal process in the VM that initiates the portion of the traffic; and
an inspection module, which is configured to inspect the selected portion of the traffic, so as to verify whether any of the executable software code is malicious.

17. The system according to claim 16, wherein the network endpoint comprises a virtual switch that serves the VM, and wherein the traffic selection module is coupled to the virtual switch.

18. The system according to claim 16, wherein the inspection module is configured to detect in the traffic one or more executable files suspected of being malicious code.

19. The system according to claim 16, wherein the inspection module is configured to detect a suspected shellcode in the traffic.

20. The system according to claim 16, wherein the traffic selection module is configured to select the portion from traffic that is exchanged between Virtual Machines (VMs) within a single physical node of the computer network.

21. The system according to claim 16, wherein the traffic selection module is configured to send for inspection only a predefined data size in a beginning of each selected traffic session.

22. The system according to claim 16, wherein the traffic selection module is configured to prioritize selection of the portion based on an a-priori characteristic of the traffic.

23. The system according to claim 16, wherein the traffic selection module is configured to receive indications external to the traffic, and to prioritize selection of the portion based on the indications.

24. The system according to claim 16, wherein the traffic selection module is configured to identify a file that is transferred in the traffic, to examine a header of the file, and to select the file for inspection upon identifying, based on the header, that the file is executable.

25. The system according to claim 16, wherein the traffic selection module is configured to coordinate selection of the portion with one or more peer traffic selection modules running in the computer network.

26. The system according to claim 16, wherein, upon detection of malicious executable software code in given traffic, the traffic selection module is configured to select for inspection subsequent traffic having characteristics that match the given traffic.

27. A system for security in a computer network that exchanges traffic among multiple network endpoints, the system comprising:
a traffic selection module, which is configured to define a prioritization among suspected traffic sessions in accordance with deviation of the suspected traffic sessions from a predefined baseline behavior, and to select one or more of the suspected traffic sessions for inspection based on the prioritization; and
an inspection module, which is configured to inspect the selected portion of the traffic, so as to verify whether any of the executable software code is malicious.

28. A computer software product, the product comprising a tangible non-transitory computer-readable medium in which program instructions are stored, which instructions, when read by a processor of a compute node in a computer network that exchanges traffic among multiple network endpoints, cause the processor to select, from the traffic generated in a Virtual Machine (VM) running on a network endpoint, only a portion of the traffic that is suspected of carrying executable software code, by examining using memory introspection an internal process in the VM that initiates the portion of the traffic, and to send the selected portion of the traffic for inspection so as to verify whether any of the executable software code is malicious.

* * * * *